(12) United States Patent
Robertson

(10) Patent No.: US 10,103,874 B2
(45) Date of Patent: *Oct. 16, 2018

(54) SYSTEM AND METHOD OF MIMETIC MESSAGING SETTINGS SELECTION

(71) Applicant: BlackBerry Limited, Waterloo (CA)

(72) Inventor: Ian M. Robertson, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 159 days.

This patent is subject to a terminal disclaimer.

(21) Appl. No.: 15/193,512

(22) Filed: Jun. 27, 2016

(65) Prior Publication Data
US 2016/0308672 A1  Oct. 20, 2016

Related U.S. Application Data

(63) Continuation of application No. 10/522,353, filed as application No. PCT/CA03/01150 on Jul. 29, 2003, now Pat. No. 9,379,910.

(Continued)

(51) Int. Cl.
| | |
|---|---|
| H04L 12/58 | (2006.01) |
| H04L 9/06 | (2006.01) |
| G06Q 10/10 | (2012.01) |
| H04W 4/12 | (2009.01) |
| H04L 9/14 | (2006.01) |

(Continued)

(52) U.S. Cl.
CPC ......... *H04L 9/0643* (2013.01); *G06Q 10/107* (2013.01); *H04L 9/14* (2013.01); *H04L 9/30* (2013.01); *H04L 9/3247* (2013.01); *H04L 9/3263* (2013.01); *H04L 51/00* (2013.01); *H04L 51/08* (2013.01); *H04L 51/14* (2013.01); *H04L 51/16* (2013.01); *H04L 63/045* (2013.01); *H04W 4/12* (2013.01); *H04L 63/0823* (2013.01); *H04W 28/18* (2013.01)

(58) Field of Classification Search
CPC ....... G06Q 10/107; G06F 15/16; H04W 4/12; H04L 12/58
See application file for complete search history.

(56) References Cited

U.S. PATENT DOCUMENTS

| | | | |
|---|---|---|---|
| 5,544,316 | A | 8/1996 | Carpenter et al. |
| 5,754,306 | A | 5/1998 | Taylor et al. |

(Continued)

FOREIGN PATENT DOCUMENTS

WO   200235869   5/2002

OTHER PUBLICATIONS

Ramsdell, S/MIME Version 3 Message Specification (Year: 1999).*

(Continued)

*Primary Examiner* — Arvin Eskandarnia
(74) *Attorney, Agent, or Firm* — Fish & Richardson P.C.

(57) ABSTRACT

Systems and methods of selecting message settings mimetically on a messaging client. In one embodiment, when an outgoing message is composed on a messaging client, the messaging client determines whether the outgoing message is related to a received message. Where the outgoing message is related to the received message, the messaging client determines the messaging settings used in the received message, and selects the messaging settings used in the received message to control message characteristics of the outgoing message.

17 Claims, 5 Drawing Sheets

Related U.S. Application Data

(60) Provisional application No. 60/398,800, filed on Jul. 29, 2002.

(51) Int. Cl.
  *H04L 9/30* (2006.01)
  *H04L 9/32* (2006.01)
  *H04L 29/06* (2006.01)
  *H04W 28/18* (2009.01)

(56) References Cited

U.S. PATENT DOCUMENTS

| | | |
|---|---|---|
| 5,809,232 A | 9/1998 | Johnson |
| 5,878,230 A | 3/1999 | Weber et al. |
| 5,905,863 A | 5/1999 | Knowles et al. |
| 5,958,005 A | 9/1999 | Thorne et al. |
| 6,356,937 B1 | 3/2002 | Montville et al. |
| 6,411,685 B1 | 6/2002 | O'Neal |
| 6,434,222 B1 | 8/2002 | Shaffer et al. |
| 6,442,600 B1 | 8/2002 | Anderson |
| 6,496,853 B1 | 12/2002 | Klein |
| 6,609,196 B1 | 8/2003 | Dickinson et al. |
| 6,732,101 B1 | 5/2004 | Cook |
| 6,832,245 B1 | 12/2004 | Isaacs et al. |
| 7,035,903 B1 | 4/2006 | Baldonado |
| 7,127,606 B2 | 10/2006 | Wheeler |
| 7,209,951 B2 | 4/2007 | Goldberg |
| 7,430,582 B1 | 9/2008 | Bates et al. |
| 7,769,817 B2 | 8/2010 | Bates et al. |
| 2001/0037315 A1 | 11/2001 | Saliba et al. |
| 2002/0121394 A1 | 9/2002 | Kamen |
| 2002/0129275 A1 | 9/2002 | Decuir |
| 2002/0147778 A1 | 10/2002 | Dutta |
| 2003/0070077 A1 | 4/2003 | Redlich et al. |
| 2003/0115448 A1 | 6/2003 | Bouchard |
| 2003/0131063 A1 | 7/2003 | Breck |
| 2003/0225837 A1 | 12/2003 | Delia et al. |
| 2004/0002932 A1 | 1/2004 | Horvitz et al. |
| 2004/0025057 A1 | 2/2004 | Cook |
| 2004/0139162 A1 | 7/2004 | Adams et al. |
| 2004/0139163 A1 | 7/2004 | Adams et al. |
| 2005/0039028 A1 | 2/2005 | Eason |
| 2005/0091327 A1 | 4/2005 | Koch |
| 2006/0031299 A1 | 2/2006 | Robertson |
| 2008/0281934 A1 | 11/2008 | Bates et al. |
| 2016/0308672 A1* | 10/2016 | Robertson ............ G06Q 10/107 |

OTHER PUBLICATIONS

Atkins et al.; "Network Working Group Request for Comments 1991, PGP Message Exchange Formats"; Aug. 1996; XP-002206142.

DeMoura, M. et al.; "SMMM—A Secure Multimedia Mail System"; Multimedia and Expo, 2000; ICME 2000; 2000 IEEE International Conference in New York, NY, USA; Jul. 30-Aug. 2, 2000; Piscataway, New Jersey, USA; IEEE, US, Jul. 30, 2000; pp. 1501-1504; XM-010512790.

"Netscapetut Bodytext"; GlobalSign Support—Personal Certificates and Netscape Communicator; Oneline!; Aug. 19, 2000; XP-002283474.

Ramsdell, B.; "RFC 2633: S/MIME Version 3 Message Specification"; IETF Network Working Group; Jun. 1999; XP-002262227; http://www.ietf.org/rfc/rfc2633.txt.; 32 pages.

"The Windows Interface Guidelines for Software Design"; Microsoft Press; Redmond, Washington, US; 1995.

International Preliminary Examination Report issued in International Application No. PCT/CA2003/01150 dated Jun. 7, 2005; 7 pages.

Written Opinion issued in International Application No. PCT/CA2003/01150 dated Mar. 29, 2004; 2 pages.

First Examination Report issued in Indian Application No. 331/DELNP/2005 dated Nov. 22, 2005; 2 pages.

Second Examination Report issued in Indian Application No. 331/DELNP/2005 dated Nov. 9, 2006; 1 page.

Communication Pursuant to Article 96(2) EPC issued in European Application No. 03771035.7 dated Jul. 28, 2006; 6 pages.

\* cited by examiner

SYSTEM AND METHOD OF MIMETIC MESSAGING SETTINGS SELECTION

CROSS-REFERENCE TO RELATED APPLICATION

This application is a continuation of U.S. patent application Ser. No. 10/522,353, filed on Jan. 26, 2005, now issued as U.S. Pat. No. 9,379,910, which is a National Stage filing of PCT Application Serial No. PCT/CA/2003/001150, filed on Jul. 29, 2003, which claims benefit of U.S. Provisional Application Ser. No. 60/398,800, filed on Jul. 29, 2002, the entire contents of which is hereby incorporated by reference for all purposes.

TECHNICAL FIELD

This invention relates generally to the field of electronic messaging, and in particular to selecting messaging settings to control message characteristics on a messaging client.

BACKGROUND ART

Known electronic messaging software clients ("messaging clients"), such as e-mail software applications operating on desktop computer systems, can use only one set of messaging settings at a time. Messaging settings may be established, using a mouse, a keyboard or another input device for example, to control such message characteristics as formats, fonts, and common text that should appear in all outgoing messages, as well as secure messaging characteristics such as message signing, encryption, and steganography, including message hiding and other obfuscation schemes, for example. Although a user may establish more than one group of settings, only one group, previously selected as current or default settings, controls messaging operations on a messaging client at any time. In order to configure different message characteristics than those established in the current settings for an outgoing message, the current settings must be over-ridden or another group of settings must be selected. These operations may be cumbersome, particularly when message characteristics must be changed frequently, when the addressees of outgoing messages have different messaging capabilities, or when different messaging settings should be used for different types of messages, for example.

DISCLOSURE OF INVENTION

According to an aspect of the invention, a method of mimetic message settings selection on a messaging client comprises the steps of detecting an outgoing message, determining whether the outgoing message is related to a previously received message, the received message having message characteristics, determining messaging settings associated with the message characteristics of the received message where the outgoing message is related to a previously received message, and selecting the messaging settings associated with the message characteristics of the received message to control message characteristics of the outgoing message.

In accordance with another aspect of the invention, a system of mimetic messaging settings selection comprises a message store configured to store messages having message characteristics and a messaging client. The messaging client is configured to determine whether an outgoing message to be sent is related to a message in the message store, to determine messaging settings associated with the message characteristics of the message in the message store where the outgoing message is related to a message in the message store, and to select the messaging settings associated with the message characteristics of the message in the message store to control message characteristics of the outgoing message.

BEST MODE FOR CARRYING OUT THE INVENTION

Messaging settings may control general message characteristics such as message format and fonts for both unsecure messages and secure messages. Unsecure messages include, for example, classical e-mail messages that are exchanged between messaging clients through the Internet. Secure message characteristics such as message signing and encryption may also be controlled by establishing messaging settings. A secure message may be signed with a digital signature, encrypted, or both, and possibly also be processed in other ways by a messaging client operating on or in conjunction with a message sender system or intermediate system between a message sender system and a receiving messaging client which receives the secure message. For example, a secure message may be a message that has been encrypted, signed, encrypted and then signed, or signed and then encrypted by a sending messaging client according to variants of Secure Multipurpose Internet Mail Extensions (S/MIME). A secure message could similarly be encoded, compressed or otherwise processed either before or after being signed and/or encrypted. Thus, messaging settings may include general messaging settings, secure messaging settings or both.

A messaging client allows a system on which it operates to receive and possibly also send messages. Messaging clients may operate on a computer system, a handheld device, or any other system or device with communications capabilities. Many messaging clients also have additional non-messaging functions.

Figure 1:
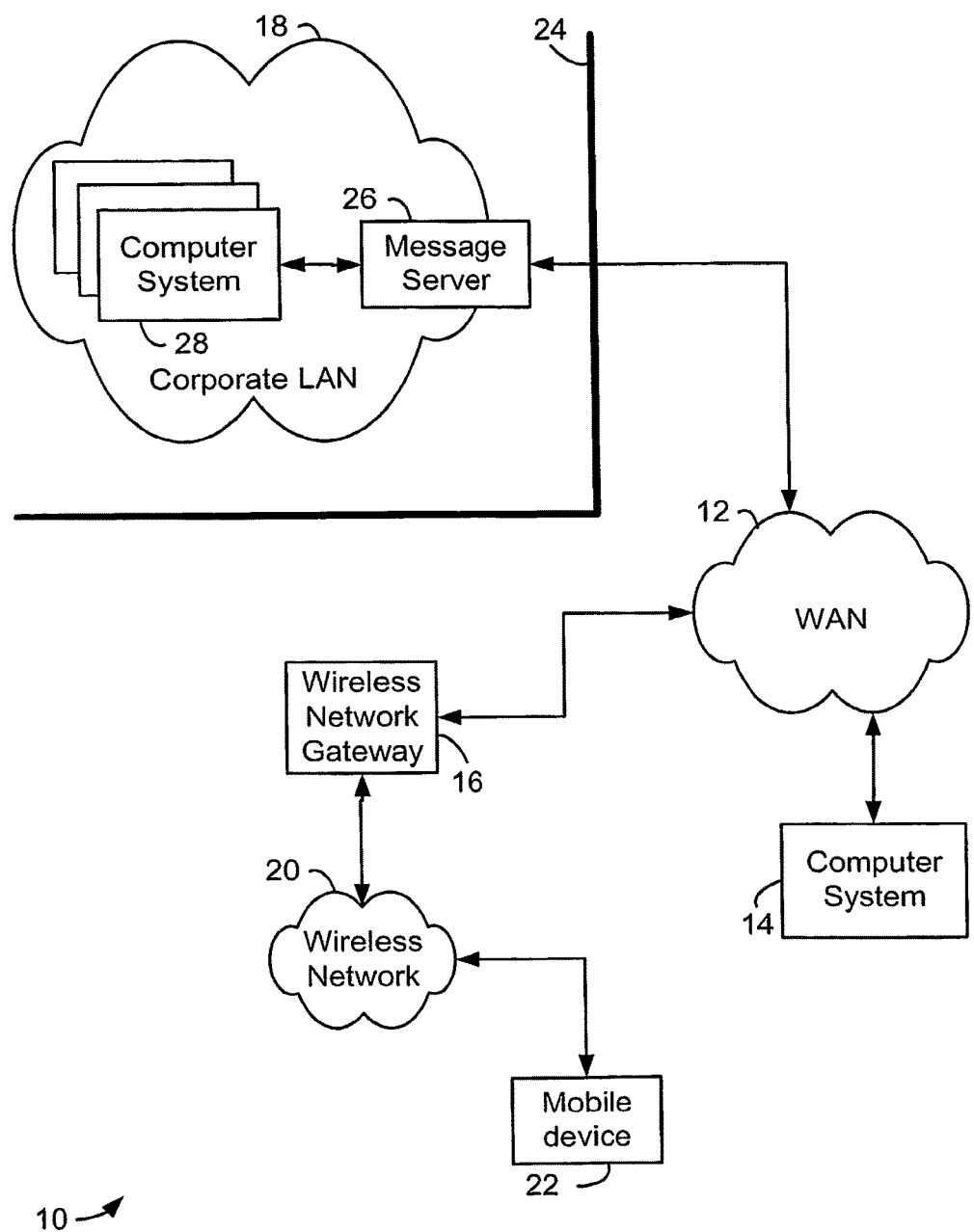
FIG. 1 is a block diagram of an exemplary messaging system.

FIG. 1 is a block diagram of an exemplary messaging system. The system 10 includes a Wide Area Network (WAN) 12, coupled to a computer system 14, a wireless network gateway 16, and a corporate Local Area Network (LAN) 18. The wireless network gateway 16 is also coupled to a wireless communication network 20, in which a wireless mobile communication device 22 ("mobile device") is configured to operate.

The computer system 14 may be a desktop or laptop personal computer (PC), which is configured to communicate to the WAN 12, which may be the Internet. PCs, such as computer system 14, normally access the Internet through an Internet Service Provider (ISP), an Application Service Provider (ASP), or the like.

The corporate LAN 18 is an example of a network-based system in which a messaging client may operate. It is normally located behind a security firewall 24. Within the corporate LAN 30, a message server 26, operating on a computer behind the firewall 24, serves as the primary interface for the corporation to exchange messages both within the LAN 18, and with other external messaging clients via the WAN 12. Two known message servers 26 are Microsoft™ Exchange server and Lotus Domino™ server. These servers 26 are often used in conjunction with Internet mail routers to route and deliver mail messages. The message server 26 may also provide additional functionality, such as dynamic database storage for calendars, to do lists, task lists, e-mail, electronic documentation, and the like.

The message server 26 provides messaging capabilities to the corporation's networked computer systems 28 coupled to the LAN 18. A typical LAN 18 includes multiple computer systems 28, each of which implements a messaging client, such as Microsoft Outlook™ or Lotus Notes, for example. Within the LAN 18, messages are received by the message server 26, distributed to the appropriate mailboxes for user accounts addressed in the received messages, and are then accessed by a user through a computer system 28 on which a messaging client is operating.

The wireless network gateway 16 provides an interface to a wireless network 20, through which messages may be exchanged with a mobile device 22. Such functions as addressing of the mobile device 22, encoding or otherwise transforming messages for wireless transmission, and any other required interface functions may be performed by the wireless gateway 16. The wireless network gateway 16 may be configured to operate with more than one wireless network 20, in which case the wireless network gateway 16 may also determine a most likely network for locating a given mobile device and track mobile devices as they roam between countries or networks.

Any computer system 14, 28 with access to the WAN 12 may exchange messages with a mobile device 22 through the wireless network gateway 16. Alternatively, private wireless network gateways, such as wireless Virtual Private Network (VPN) routers could also be implemented to provide a private interface to a wireless network. For example, a wireless VPN implemented in the LAN 18 provides a private interface from the LAN 18 to one or more mobile devices 22 through the wireless network 20. Such a private interface to mobile devices 22 via the wireless network gateway 16 and/or the wireless network 20 may also effectively be extended to entities outside the LAN 18 by providing a message forwarding or redirection system that operates with the message server 26. Such a redirection system is disclosed in U.S. Pat. No. 6,219,694, which is hereby incorporated into this application by reference. In this type of redirection system, incoming messages received by the message server 26 and addressed to an account or mailbox associated with a user of a mobile device 22 are sent through the wireless network interface, either a wireless VPN router, the wireless network gateway 16 or some other interface, to the wireless network 20 and to the user's mobile device 22. Another alternate interface to a user's mailbox on a message server 26 may be a Wireless Application Protocol (WAP) gateway. Through a WAP gateway, a list of messages in a user's mailbox on the message server 26, and possibly each message or a portion of each message, could be sent to the mobile device 22.

A wireless network 20 normally delivers messages to and from mobile devices 22 via RF transmissions between base stations and mobile devices 22. The wireless network 20 may, for example, be: (1) a data-centric wireless network, (2) a voice-centric wireless network, or (3) a dual-mode network that can support both voice and data communications over the same infrastructure. Recently developed wireless networks include: (1) the Code Division Multiple Access (CDMA) network, (2) the Groupe Special Mobile or the Global System for Mobile Communications (GSM) and the General Packet Radio Service (GPRS) networks, and (3) third-generation (3G) networks, such as Enhanced Data rates for Global Evolution (EDGE) and Universal Mobile Telecommunications Systems (UMTS). Examples of data-centric network include: (1) the Mobitex™ Radio Network ("Mobitex"), and (2) the DataTAC™ Radio Network ("DataTAC"). Known voice-centric networks include Personal Communication Systems (PCS) networks like GSM and Time Division Multiple Access (TDMA) systems.

The mobile device 22 may be a data communication device, a voice communication device, or a multiple-mode device capable of voice, data and other types of communications. An exemplary mobile device is described in further detail below, in conjunction with FIG. 6.

Perhaps the most common type of messaging currently in use is e-mail. In a standard e-mail system, an e-mail message is sent by an e-mail sender, possibly through a message server and/or a service provider system, and may then be routed through the Internet to one or more message receivers. E-mail messages are normally sent in the clear and typically use Simple Mail Transfer Protocol (SMTP) headers and Multi-purpose Internet Mail Extensions (MIME) body parts to define the format of the e-mail message.

In recent years, secure messaging techniques have evolved to protect both the content and integrity of messages, such as e-mail messages. S/MIME and Pretty Good Privacy™ (PGP™) are two public key secure e-mail messaging protocols that provide for both encryption, to provide message confidentiality, and signing, which protects the integrity of a message and provides for sender authentication by a message receiver. In addition to utilizing digital signatures and possibly encryption, secure messages may also or instead be encoded, compressed or otherwise processed. Other secure messaging schemes, including OpenPGP and Gnu Privacy Guard (GPG) for example, may also be apparent to those skilled in the art to which the present application relates. The systems and methods described herein may be implemented in conjunction with these and other known secure messaging schemes, as well as future secure messaging schemes.

Figure 2:
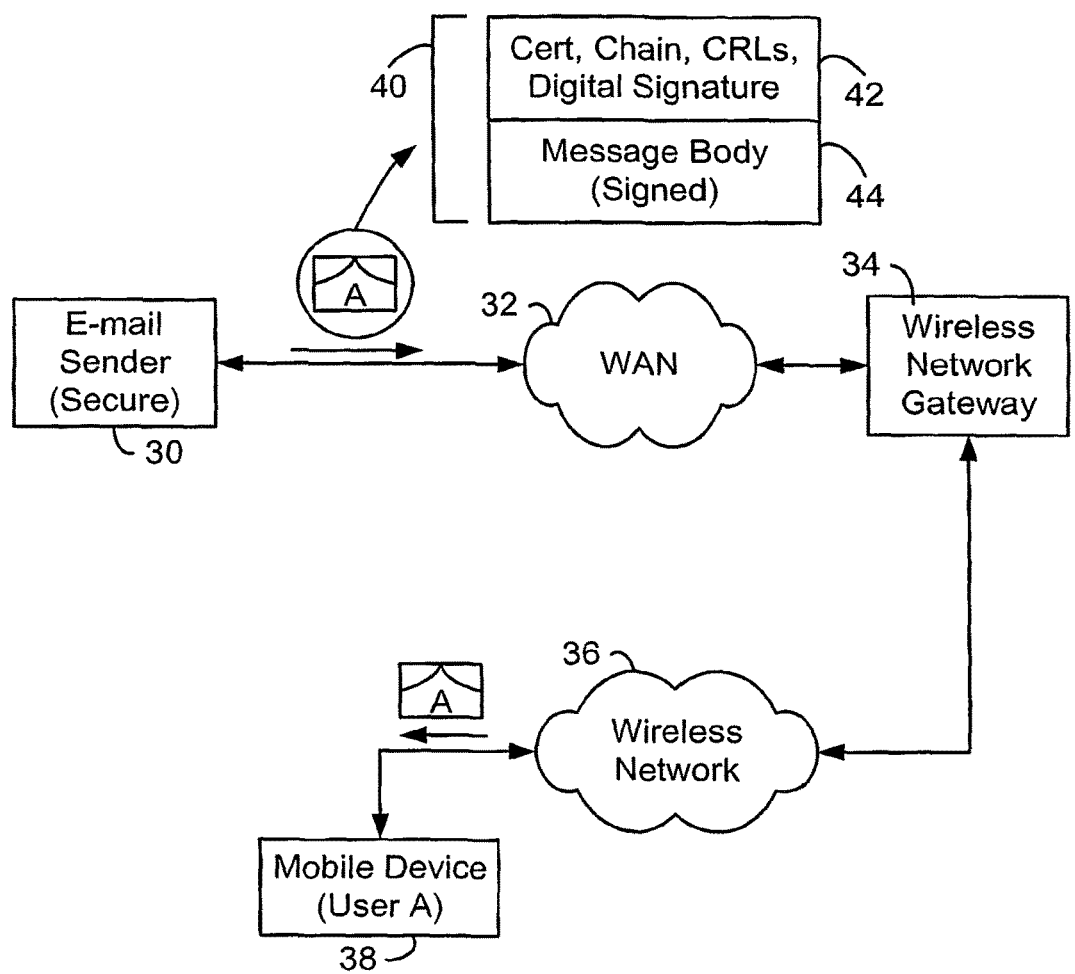
FIG. 2 is a block diagram illustrating a secure e-mail message exchange in a messaging system.

FIG. 2 is a block diagram illustrating a secure e-mail message exchange in a messaging system. The system includes an e-mail sender system 30, coupled to a WAN 32, and a wireless network gateway 34, which provides an interface between the WAN 32 and a wireless network 36. A mobile device 38 is adapted to operate within the wireless network 36.

The e-mail sender system 30 may be a PC, such as the computer system 14 in FIG. 1, or it may be a network-connected computer, such as computer 28 in FIG. 1, on which a messaging client is operating. The e-mail sender system 30 may also be a mobile device on which a messaging client operates to enable e-mail messages to be composed and sent. The WAN 32, the wireless network gateway 34, the wireless network 36 and the mobile device 38 are substantially the same as similarly-labelled components in FIG. 1.

The example secure e-mail message 40 sent by the e-mail sender 30 includes a component 42 including the sender's Cert, Cert chain, CRLs and digital signature and the signed message body 44. In the S/MIME secure messaging technique, Certs, CRLs and digital signatures are normally placed at the beginning of a message as shown in FIG. 2, and the message body is included in a file attachment. Messages generated by other secure messaging schemes may place message components in a different order than shown or include additional and/or different components. For example, a signed message may include addressing information, such as "To:" and "From:" email addresses, and other header information.

When the secure e-mail message 40 is sent from the e-mail sender system 30, it is routed through the WAN 32 to the wireless network gateway 34. Although the e-mail sender system 30 sends the message 40 directly to the wireless network gateway 34, in an alternative implementation the message is instead delivered to a computer system associated with the mobile device 38 and then sent to the mobile device 38 by the associated computer system. As described above, in a further alternative embodiment, the message is routed or redirected to the mobile device 38 through the wireless network 36 via a wireless VPN router or other interface.

The receiver of the signed message 40, the mobile device 38, checks the digital signature 42 using the sender's signature public key (in a public key signature scheme) and a signature verification algorithm corresponding to the signature algorithm used at the sender system 30. If the secure, message 40 was encrypted or otherwise processed at the sender system 30 after being signed, then the mobile device 38 first decrypts or performs other inverse processing operations on the message before signature verification is performed. If encryption or processing was performed before signing, however, inverse processing such as decryption is performed after signature verification.

In order to verify the digest signature, the receiver 38 retrieves the signature public key of the sender, generally by extracting the public key from the sender's Cert 42 attached to the message 40, and then performs the signature verification algorithm using the retrieved public key. The secure message 40 shown in FIG. 2 includes the sender's Cert 42, from which the sender's public key can be extracted. The sender's public key may also be retrieved from a local store, for example where the public key was extracted from an earlier message received from the sender and stored in a key store in the receiver's local store. Alternatively, the public key may be retrieved from the sender's Cert stored in a local store, or from a Public Key Server (PKS). A PKS is a server that is normally associated with a Certificate Authority (CA) from which a Cert for an entity, including the entity's public key, is available. A PKS might reside within a corporate LAN such as 18 (FIG. 1), or anywhere on the WAN 32, the Internet or any other network or system through which message receivers may establish communications with the PKS.

The Cert, Cert chain and CRLs 42 are used by a receiver to ensure that the sender's Cert is valid, i.e., that the Cert has not been revoked or expired, and is trusted. A Cert is often part of a Cert chain, which includes a user's Cert as well as other Certs to verify that the user's Cert is authentic. For example, a Cert for any particular entity typically includes the entity's public key and identification information that is bound to the public key with a digital signature. Several types of Cert currently in use include, for example, X.509 Certs, which are typically used in S/MIME, and PGP Certs, which have a slightly different format. In S/MIME, the digital signature in a Cert is generated by the issuer of the Cert, and can be checked by a message receiver as described above. A Cert may include an expiry time or validity period from which a messaging client may determine if the Cert has expired. Each Cert may also be checked against a CRL to ensure that the Cert has not been revoked.

If the digital signature in a message sender's Cert is verified, the Cert has not expired or been revoked and the issuer of the Cert is trusted by a message receiver, then the digital signature of the message is trusted by the message receiver. If the issuer of the Cert is not trusted by the receiver, then the message receiver may trace a certification path through the Cert chain to verify that each Cert in the chain was signed by its issuer, whose Cert is next in the Cert chain, until a Cert is found that was signed by a root Cert from a source trusted by the receiver, such as from a large PKS. Once a root Cert is found, then a signature can be trusted, because both the sender and receiver trust the source of the root Cert. This trust mechanism is used, for example, in S/MIME. Although other messaging schemes, including PGP, for example, may use different trust mechanisms, the present invention is in no way dependent upon a particular signature scheme or trust mechanism.

At the e-mail sender system 30, secure messaging characteristics, message signing in the message 40, may be controlled by messaging settings. These message settings are either default messaging settings or a currently selected group of messaging settings established by a user, or possibly custom message settings established by over-riding default or current messaging settings. In known systems, whenever a message having different message characteristics than those specified in a current group of messaging settings is to be sent from a messaging client, a different group of messaging settings must be selected or current settings must be over-ridden.

Frequent messaging settings changes are not only tedious and time consuming, but are also prone to error. For example, some secure messaging clients may be configured to exchange either secure or unsecure messages with other messaging clients. However, a messaging client that may not be configured for secure messaging is unable to process received secure messages.

As described above, known messaging clients allow only a single group of messaging settings to be active at any time. Therefore, when a secure messaging client exchanges messages with unsecure messaging clients relatively often, a user of the secure messaging client might normally select only general messaging settings as default messaging settings to ensure that sent messages may be processed by unsecure messaging clients. Then, when a secure message is to be sent to a secure messaging client, a different group of settings is selected or the current general messaging settings are over-ridden, so that a secure message is sent. When a user forgets to select secure messaging settings or over-ride general messaging settings, a message that was intended be sent securely is sent in the clear. This situation may be particularly undesirable when such a message contains confidential information, for example. Similarly, when secure messaging settings are used as default settings and not over-ridden when a message is to be sent to an unsecure messaging client, the unsecure messaging client will be unable to process the secure message and the user must re-transmit the message in an unsecure format.

According to an aspect of mimetic messaging settings selection as described herein, when a message to be sent from a messaging client is related to a received message, the messaging client determines the messaging settings used in the received message and selects the messaging settings used in the received message to control message characteristics of the reply message. Such mimetic settings selection can reduce the number of times that a user must manually change messaging settings, and also allows a message sender to establish messaging settings for an entire "conversation", including both an original message and any related messages. Related messages are messages that include at least a portion of a received message, such as reply messages and forward messages, for example.

Figure 3:
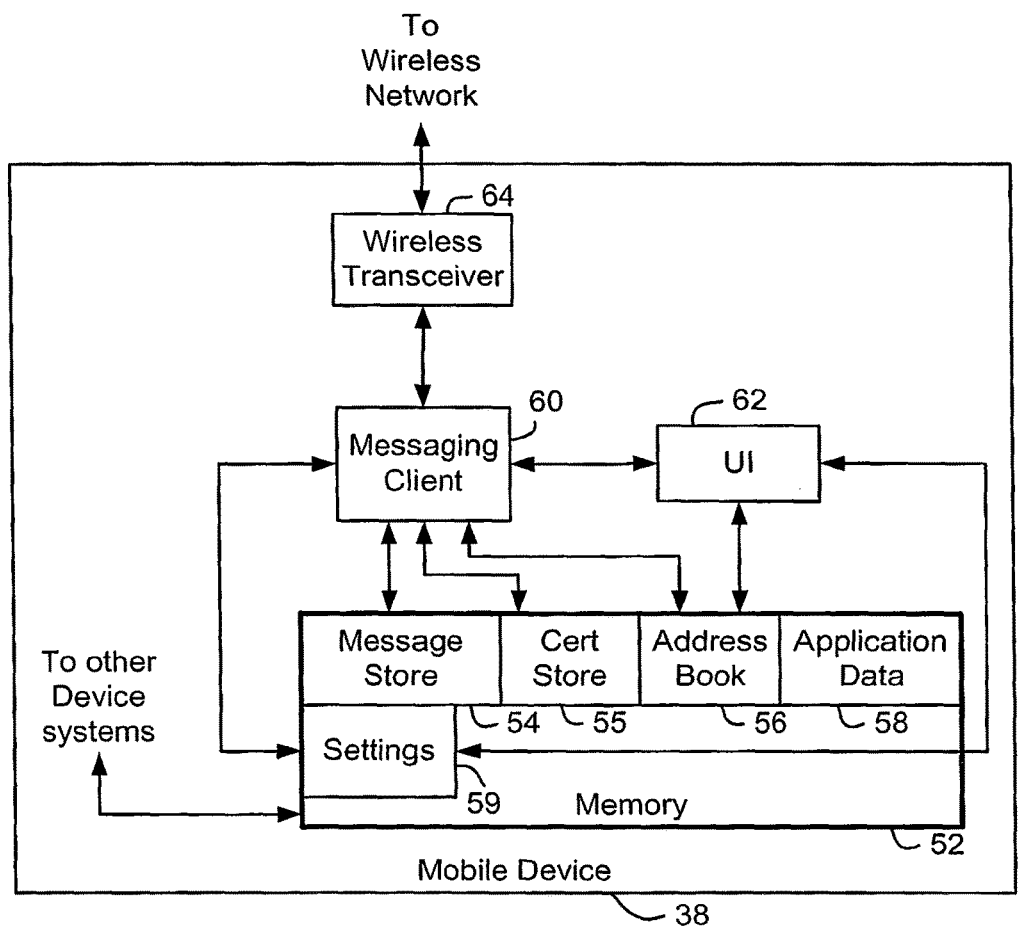
FIG. 3 is a block diagram of a wireless mobile communication device implementing a mimetic messaging settings selection system.

FIG. 3 is a block diagram of a wireless mobile communication device implementing a mimetic messaging settings selection system.

The mobile device 38 includes a memory 52, a messaging client 60, a user interface (UI) 62, and a wireless transceiver 64.

The memory 52 is a writeable store such as a RAM into which other device components and systems may write data, and includes a storage area for a message store 54, as well as other data stores such as a Cert store 55, an address book 56 in which messaging contact information is stored, an application data storage area 58 which stores data associated with software applications on the mobile device 38, and a settings store 59 which stores messaging settings. Data stores 54, 55, 56, 58 and 59 are illustrative examples of stores that may be implemented in a memory 52 on mobile device 38. The memory 52 may also be used by other device systems in addition to those shown in FIG. 3 to store other types of data.

The messaging client 60 is connected to the wireless transceiver 64 and is thus enabled for communications via a wireless network.

The UI 62 may include such UI components as a keyboard or keypad, a display, or other components which accept inputs from or provide outputs to a user of the mobile device 38. A mobile device 38 typically includes more than one UI, and the UI 62 therefore represents one or more user interfaces.

Messages received by the messaging client 60 via the transceiver 64 are stored in the message store 54. The message store 54 may also be used to store messages that are sent by the messaging client 60.

The messaging client 60 stores received Certs to the Cert store 55 and retrieves stored Certs from the Cert store 55. Certs are normally stored in the Cert store 55 in the format in which they are received, but may alternatively be parsed or otherwise translated into a storage format before being written to the Cert store 55. Certs may be received with secure messages, requested from a Cert source such as a PKS via the wireless transceiver 64, or loaded onto the mobile device 38 through a communications interface such as a serial port, Universal Serial Bus (USB) port, Infrared Data Association (IrDA) port, Bluetooth™ module, or an 802.11 module, from a similarly equipped external system, a PC for example. Those skilled in the art will appreciate that "Bluetooth" and "802.11" refer to sets of specifications, available from the Institute of Electrical and Electronics Engineers (IEEE), relating to personal area networks and wireless LANs, respectively. As described above, a public key in a Cert may be required for sending or receiving secure messages.

The address book 56 stores contact information, at least some of which is preferably used by the messaging client 60 in messaging operations. Entries in an address book 56 are typically most often used for addressing messages to be sent from a messaging client. Address book entries are also used to replace addressing information, such as an e-mail address, with a personal or familiar name when a message that is received from a sender for which an address book entry exists in the address book 56 is displayed to a user of the mobile device 38. An address book entry can typically be created either manually, for example by inputting contact information or selecting an address from a received message using a UI 62, or automatically, such as by configuring the messaging client 60 to store contact information when a message is received from a sender for which no entry exists in the address book 56. Contact information could also possibly be extracted and stored in the address book 56 when a new Cert is stored to the Cert store 55, as described in the International Patent Application Serial No. PCT/CA03/00406, entitled "Certificate Information Storage System And Method", filed on 20 Mar. 2003, assigned to the assignee of the present application, and incorporated herein by reference.

The settings store 59 stores messaging settings which control the characteristics of outgoing messages sent from the mobile device 38. The settings store 59 may store more than one group of messaging settings, although in known systems, only one previously selected group of settings is active at any time. A typical messaging client determines which group of messaging settings was previously selected and uses those settings to control the characteristics of an outgoing message.

The messaging client 60, however, is configured to provide for selection of different messaging settings for different types of outgoing message. This feature may be enabled, for example, for mimetic messaging settings selection for reply messages. The concept of mimetic messaging settings selection will be further described below with reference to FIGS. 4 and 5.

Figure 4:
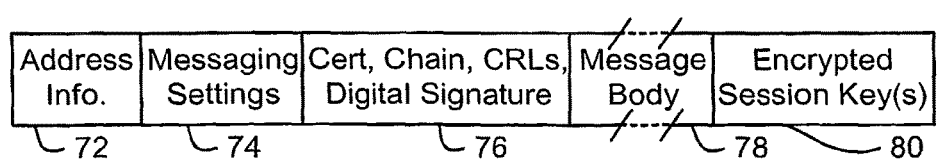
FIG. 4 is a block diagram showing an exemplary message structure that supports mimetic messaging settings selection.

FIG. 4 is a block diagram showing an exemplary message structure that supports mimetic messaging settings selection. Although the example message 70 is a secure message that has been both signed and encrypted, it should be understood that mimetic messaging settings selection may be applied to other types of secure messages, such as signed-only or encrypted-only messages, or to unsecure messages.

The message 70 includes an address information portion 72, a messaging settings portion 74, a digital signature-related information portion 76, a message body 78, and one or more encrypted session keys 80. Depending upon the type of message and the type of messaging client that was used to generate the message, a message may contain more, fewer or different fields than those shown in FIG. 4. Normally, a message such as an email message, for example, will include at least an address information portion 72, some sort of message settings portion 74, and a message body 78.

The address information portion 72 includes information which identifies at least an intended receiver of the message 70. For an email message, address information typically includes "To:", "From:", and possibly "Cc:" and "Bcc:" email addresses, although, as those skilled in the art of electronic messaging will appreciate, e-mail message recipients will not typically see "Bcc:" addresses.

The messaging settings portion 74 preferably includes a group of messaging settings that were used to control the characteristics of the message 70. Messaging settings are usually manually configurable by a message sender using a messaging client, as described above. The messaging settings specified in the messaging settings portion 74 may correspond to a previously established and saved group of message settings stored in a settings store such as 59, for example, selected by a message sender when the message 70 was composed. Alternatively, a message sender may have chosen a specific "custom" set of messaging settings for the message 70. Messaging settings may control such general message characteristics as fonts, backgrounds, text size and the like, as well as secure message characteristics, including a digest algorithm for a signed message and an encryption algorithm for an encrypted message, for example.

The digital signature-related information portion 76 includes a digital signature, and possibly other signature-related information such as the sender's Cert, a Cert chain and one or more CRLs. The digital signature-related information portion 76 is processed by a message receiver as described above to verify the digital signature in the message 70.

The message body 78 includes the text or information portion of the message 70. In the message 70, the message body 78 is both signed and encrypted. A message 70 may also include file attachments in or associated with the message body portion 78. The appearance and types of processing applied to the message body 78 are controlled by the messaging settings indicated in the messaging settings portion 74.

In operation, a message 70 may be composed on the mobile device 38, or on any other device or system on or in conjunction with which a messaging client 60 is operating, using UIs 62 such as a keyboard and a display. A messaging client such as 60 is normally able to send new messages and reply messages, and also forward received messages or portions of received messages. For new messages, as described above, a user may select a group of messaging settings to control message characteristics of the new message. When no messaging settings are selected, a default group of messaging settings typically controls the message characteristics. Many messaging clients also provide a mechanism to over-ride currently selected or default messaging settings when a message is being composed.

When an outgoing message that is related to a received message is composed using the messaging client 60, however, mimetic messaging settings selection is preferably used to determine the messaging settings that should control the characteristics of the outgoing message. Outgoing messages related to a received message include such messages as reply messages or forward messages, for example, or any other messages which include at least a portion of the received message. For such messages, the messaging client 60 accesses the message store 54 (FIG. 3) to determine the messaging settings associated with message characteristics of the received message. The messaging settings associated with the message characteristics of the received message are then selected to control message characteristics of the outgoing message. The messaging client thereby selects or "profiles" the messaging settings or characteristics used for the received message, such that messaging settings used by a message sender establish message characteristics for an entire conversation, including not only an original message, but also any related messages. The messaging settings portion 74 of the message 70 supports a direct determination of messaging settings used by a message sender. However, as described in further detail below, the invention is in no way restricted to mimetic messaging settings selection based on direct determination of messaging settings used for a received message.

As described above, messaging settings may control general message characteristics, such as formats and fonts, as well as secure message characteristics, such as signing and encryption. When the selected messaging settings dictate that a secure message is to be sent, the messaging client 60 retrieves any required keys and processes the outgoing message as specified in the selected messaging settings. For example, when the selected messaging settings specify that a signed and then encrypted S/MIME message is to be sent, then the messaging client 60 may use its own private key to generate a digital signature for the message, generate a session key and use the session key to encrypt the message and the digital signature, retrieve the public key or Cert for each message recipient from the Cert store 54, and encrypt the session key with each recipient's public key.

Although certain messaging settings or characteristics, such as secure messaging settings, may be of particular concern to most message senders using a mimetic messaging settings selection system, general settings may also be important for some messaging clients. For example, a desktop computer system may be capable of displaying a message in any of a variety of fonts, whereas a mobile device may have relatively limited display capabilities. Therefore, a message sender using a messaging client on a mobile device such as 38 (FIG. 3) may prefer that an original font of a message body be used in any replies to that message, so that reply messages may be displayed properly on the mobile device.

In this example, the message sender might not necessarily wish to ensure that the same font is used for forward messages, in which the original message is forwarded to other recipients, but not to the message sender. This type of preference could possibly be specified using one or more control flags, in the messaging settings portion 74 of a message 70, for example. Such flags could control which messaging settings or characteristics are effectively carried forward to messages that are related to a received message. Control flags could provide for such functions as specifying that security-related messaging settings should be used for any messages related to a received message, whereas messaging settings controlling general message characteristics such as fonts or backgrounds should be used for reply messages but not forward messages. Thus, for an outgoing message, a messaging client determines whether the message is related to a received message and may then determine a type of the outgoing message. When control flags are used, the messaging client then selects messaging settings for the outgoing message in accordance with the type of the message and the control flags.

It may also be desirable in some circumstances not to preclude the use of default or other messaging settings when a group of messaging settings is selected through mimetic messaging settings selection. When an outgoing, message prepared at the messaging client 60 is a forward message, wherein a received message or a portion thereof is to be forwarded to a message recipient, messaging settings used for the received message may be selected to control the message characteristics of the outgoing message, as described above. However, if a user of the messaging client 60 is aware of certain limitations of a messaging client used by a recipient of the forward message, then the user may wish to change the selected messaging settings or specify further messaging settings to allow the forward message to be processed by the message recipient.

The use of control flags or similar indicators also provides for some measure of control over which particular messaging settings used for a received message may be changed or whether additional messaging settings may be used for a an outgoing message related to the received message. For example, an over-ride flag may be set when any of the messaging settings used for a received message may be over-ridden for an outgoing message related to the received message, or reset when none of the messaging settings may be over-ridden. A similar flag, group of flags, or list of messaging settings may indicate which messaging settings or characteristics may, or alternatively, may not, be changed for related messages. A further flag may be used to indicate whether additional messaging settings may be specified for related messages or certain types of related messages.

A messaging settings portion 74 of a received message 70 might also specify alternative messaging settings that may be used for an outgoing related message instead of particular messaging settings used for the received message. For example, a received message 70 could be a signed and encrypted S/MIME message for which the SHA1 hashing algorithm was used to generate a hash of the message body 78 (and the encrypted session keys 80 if the message was encrypted and then signed). In order to provide for some flexibility in regard to messaging settings used by a receiving messaging client for outgoing messages related to the received message, the messaging settings portion 74 may specify that a digital signature for a related outgoing message could be generated using MD5 instead of SHA1. Thus, when an outgoing related message is to be sent from the receiving messaging client to another messaging client which supports MD5, but not SHA1, such as a messaging client which supports Version 2 of S/MIME, the receiving messaging client may use MD5 instead of SHA1 to generate a digital signature for the outgoing message. In this example, the receiving messaging client profiles the messaging settings of the received message in that the original message is signed, and the sender of the received message maintains some level of control of messaging settings used for any related messages.

When alternative messaging settings are specified in a received message, an order of preference may be explicitly specified in the message, or, for example, inherent in the order in which the alternative messaging settings are listed in the message. Messaging settings that were used for the received message may be preferred over any other messaging settings, and the alternative messaging settings may be listed in order of preference. A sender of a received message may also specify different alternative messaging settings for different types of related messages, such as reply messages and forward messages. In the above example of hashing algorithms, if a sending messaging client supports only MD5, then alternative hashing algorithms may be specified for forward messages, but not for reply messages.

According to another variation, a messaging client may be configured to allow messaging settings to be established for an outgoing related message in addition to any messaging settings of a received message that are to be profiled in the outgoing message. For example, if a received message is encrypted, then a related outgoing message might be both encrypted and signed. Even though additional messaging settings may be selected for a related message, certain characteristics of a received message, encryption in the above example, are profiled in an outgoing related message. Such a technique is analogous to logically OR-ing messaging settings, in that messaging settings for a related message may be added by a messaging client, but messaging settings of a received message that are to be profiled in outgoing related messages are preferably not deselected or over-ridden.

As a further extension of these principles, a received message might also or instead specify message characteristics that are to be profiled for any related messages. Instead of specifying that SHA1 is to be used to generate a digital signature for related messages, for example, a received message may specify that any related message is to be signed. A receiving messaging client is then free to choose a hashing and signing algorithm. In this case, profiling is performed on the basis of message characteristics, and a messaging client selects appropriate messaging settings in order to profile the characteristics of a received message. Such message characteristic profiling further extends the flexibility of messaging settings selection systems and methods. For example, a received message that is encrypted and signed using S/MIME may specify only that related messages should be encrypted and signed. A receiving messaging client may then use PGP or another secure messaging scheme to encrypt and sign outgoing related messages. As described above, different messaging settings may be allowed only for certain types of related messages. The control flags, preferences, and other features described above in the context of messaging settings are also applicable to message characteristics.

It should be apparent that a sender of a received message need not necessarily support the same type or format of messaging settings. Where the sender and receiver use different types of messaging client, the receiver preferably selects messaging settings for any outgoing related messages based on a translation or similar interpretation of sender-side messaging settings, a set of message characteristics specified in the received message, or the actual message characteristics of the received message. Mimetic messaging settings selection based on actual message characteristics is possible even where a receiving messaging client cannot correctly interpret messaging settings or characteristics specified in a received message.

Figure 5:
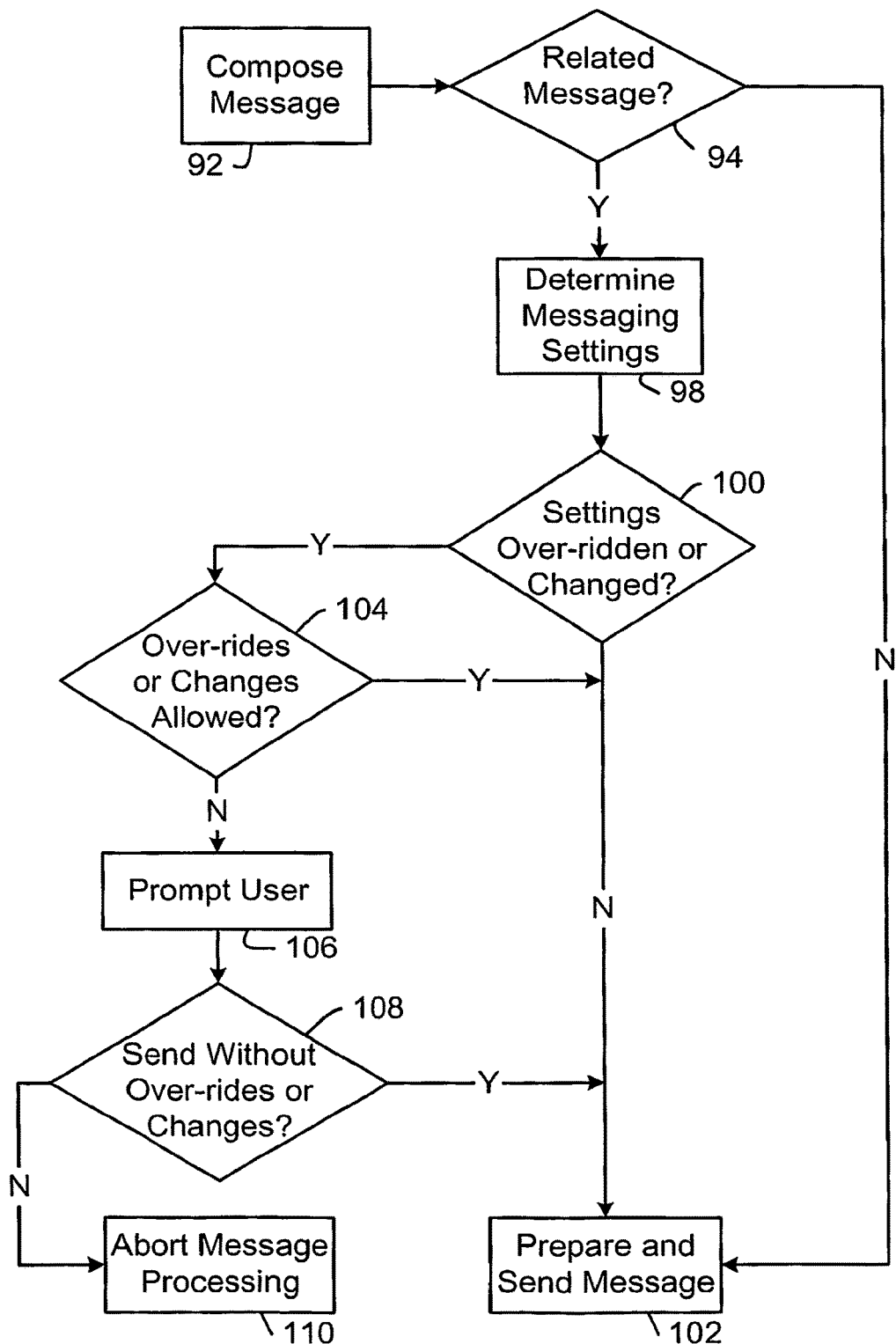
FIG. 5 is a flow chart illustrating a method of mimetic messaging settings selection.

FIG. 5 is a flow chart illustrating a method of mimetic messaging settings selection on a messaging client.

The method begins at step 92, when an outgoing message is composed on a messaging client. The messaging client then determines whether the outgoing message is related to a received message at step 94. An outgoing message is a message, such as a reply message or a forward message for example, that includes at least a portion of a received message. The check at step 94 may be performed, for example, when a compose message operation is initiated, while a message is being composed, or when a user attempts to send a composed message. If the outgoing message is not related to a received message, then the message is prepared for transmission, by encoding, signing, encrypting or other processing, in accordance with default or selected messaging settings, and sent to each recipient at step 102.

Where the outgoing message is related to a received message, the messaging client determines the messaging settings associated with message characteristics of the received message, at step 98, and selects such messaging settings to control message characteristics of the outgoing message. As described above, the messaging settings associated with message characteristics of a received message may be determined by accessing a message store, for example. At step 100, the messaging client determines whether a user of the messaging client, or possibly the messaging client itself, is attempting to over-ride or change any of the selected messaging settings. If not, then the outgoing message is prepared for sending by performing processing operations in accordance with the selected messaging settings and sent to each message recipient at step 102.

If the messaging settings are over-ridden or changed, either by changing one or more messaging settings or by specifying additional messaging settings to be used, the messaging client preferably determines whether the over-rides or changes are allowed, at step 104, for example by checking control flags, alternative settings or characteristics lists, and the like, in the received message. Where the over-rides or changes are allowed, the message is prepared according to the over-ridden or changed messaging settings and sent to each recipient at step 102. Otherwise, the messaging client may display an alert or error message and/or prompt the user for further input at step 106. In some circumstances, the outgoing message may possibly be sent, without the messaging settings over-rides or changes, if the message recipients are able to process the outgoing message with the messaging settings used for the received message, for example. A user may then choose to send the outgoing message without the message settings over-rides or changes, as determined at step 108, and the message is prepared and sent at step 102. If the user chooses not to send the outgoing message without the messaging settings over-rides or changes, then message processing may be aborted at step 110. Other error or exception processing may also be invoked if an outgoing message cannot be sent without messaging settings over-rides or changes or a user chooses not to send an outgoing message without messaging settings over-rides or changes.

As described above for step 94, step 100 and the steps related thereto may be performed when a compose message function is started, during message composition, or when a user attempts to send a composed message.

Figure 6:
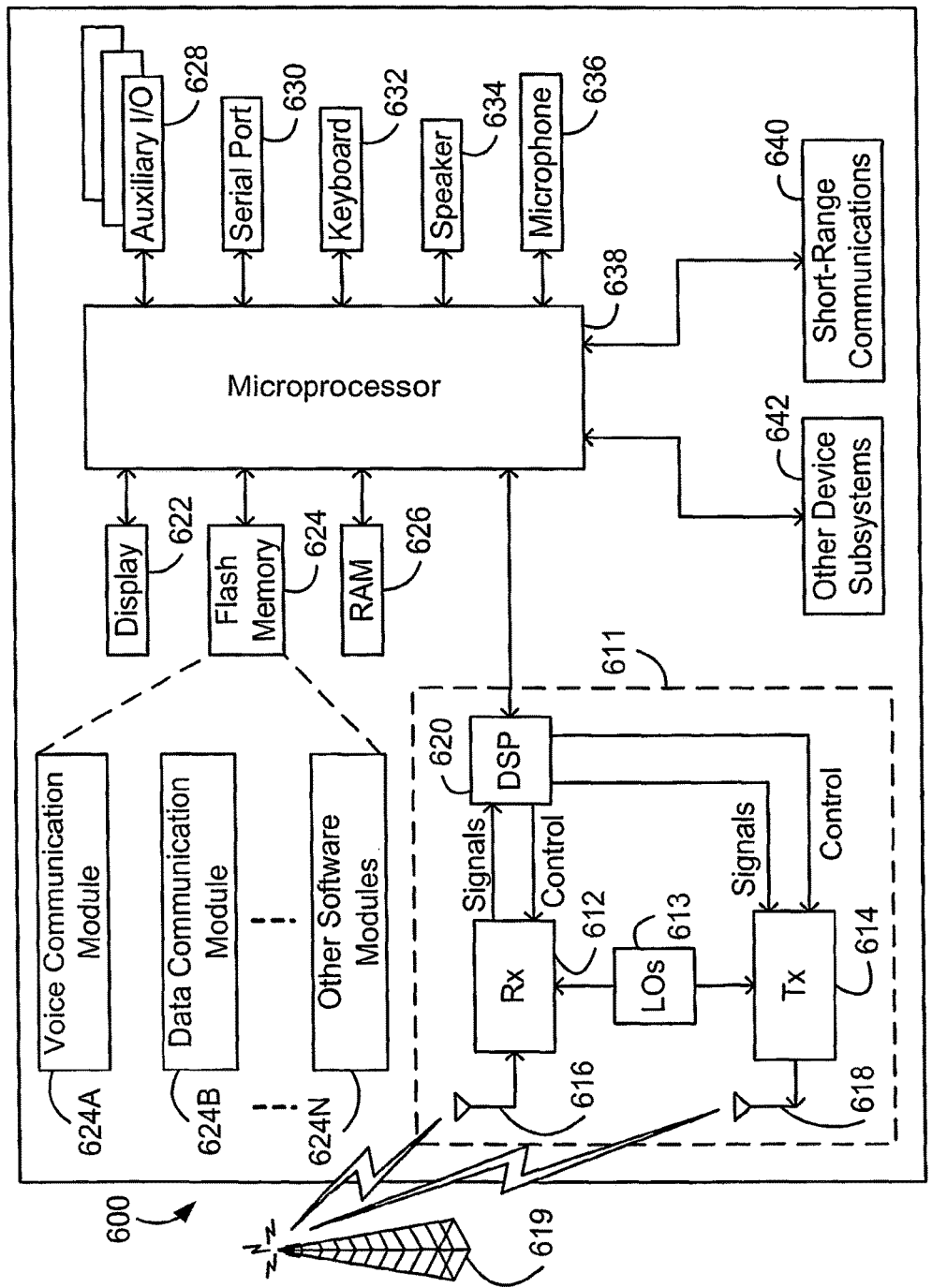
FIG. 6 is a block diagram of a wireless mobile communication device.

FIG. 6 is a block diagram of a wireless mobile communication device. The mobile device 600 is preferably a dual-mode, two-way communication device having at least voice and data communication capabilities. The device preferably has the capability to communicate with other computer systems on the Internet. Depending on the functionality provided by the mobile device 600, the mobile device may be referred to as a data messaging device, a two-way pager, a cellular telephone with data messaging capabilities, a wireless Internet appliance or a data communication device (with or without telephony capabilities).

The mobile device 600 includes a transceiver 611, a microprocessor 638, a display 622, Flash memory 624, random access memory (RAM) 626, auxiliary input/output (I/O) devices 628, a serial port 630, a keyboard 632, a speaker 634, a microphone 636, a short-range wireless communications sub-system 640, and other device subsystems 642. The transceiver 611 preferably includes transmit and receive antennas 616, 618, a receiver (Rx) 612, a transmitter (Tx) 614, one or more local oscillators (LOs) 613, and a digital signal processor (DSP) 620. Within the Flash memory 624, the mobile device 600 includes a plurality of software modules 624A-624N that can be executed by the microprocessor 638 (and/or the DSP 620), including a voice communication module 624A, a data communication module 624B, and a plurality of other operational modules 624N for carrying out a plurality of other functions.

As described above, the mobile device 600 is preferably a two-way communication device having voice and data communication capabilities. Thus, for example, the mobile device 600 may communicate over a voice network, such as any of the analog or digital cellular networks, and may also communicate over a data network. The voice and data networks are depicted in FIG. 6 by the communication tower 619. These voice and data networks may be separate communication networks using separate infrastructure, such as base stations, network controllers, etc., or they may be integrated into a single wireless network.

The communication subsystem 611 is used to communicate with the network 619. The DSP 620 is used to send and receive communication signals to and from the transmitter 614 and receiver 612, and also exchanges control information with the transmitter 614 and receiver 612. If the voice and data communications occur at a single frequency, or closely-spaced set of frequencies, then a single LO 613 may be used in conjunction with the transmitter 614 and receiver 612. Alternatively, if different frequencies are utilized for voice communications versus data communications, then a plurality of LOs 613 can be used to generate a plurality of frequencies corresponding to the network 619. Although two antennas 616, 618 are depicted in FIG. 6, the mobile device 600 could be used with a single antenna structure. Information, which includes both voice and data information, is communicated to and from the communication module 611 via a link between the DSP 620 and the microprocessor 638.

The detailed design of the communication subsystem 611, such as frequency band, component selection, power level, etc., is dependent upon the communication network 619 in which the mobile device 600 is intended to operate. For example, a mobile device 600 intended to operate in a North American market may include a communication subsystem 611 designed to operate with the Mobitex or DataTAC mobile data communication networks and also any of a variety of voice communication networks, such as AMPS, TDMA, CDMA, PCS, etc., whereas a mobile device 600 intended for use in Europe may be configured to operate with the GPRS data communication network and the GSM voice communication network. Other types of data and voice networks, both separate and integrated, may also be utilized with the mobile device 600.

Depending upon the type of network 619, the access requirements for the dual-mode mobile device 600 may also vary. For example, in the Mobitex and DataTAC data networks, mobile devices are registered on the network using a unique identification number associated with each device. In GPRS data networks, however, network access is associated with a subscriber or user of a mobile device 600. A GPRS device typically requires a subscriber identity module ("SIM"), which is required in order to operate the mobile device 600 on a GPRS network. Local or non-network communication functions (if any) may be operable, without the SIM, but the mobile device 600 will be unable to carry out any functions involving communications over the network 619, other than any legally required operations, such as '911' emergency calling.

After any required network registration or activation procedures have been completed, the mobile device 600 may send and receive communication signals, preferably including both voice and data signals, over the network 619. Signals received by the antenna 616 from the communication network 619 are routed to the receiver 612, which provides for signal amplification, frequency down conversion, filtering, channel selection, etc., and analog to digital conversion. Analog to digital conversion of the received signal allows more complex communication functions, such as digital demodulation and decoding to be performed using the DSP 620. In a similar manner, signals to be transmitted to the network 619 are processed, including modulation and encoding, for example, by the DSP 620 and are then provided to the transmitter 614 for digital to analog conversion, frequency up conversion, filtering, amplification and transmission to the communication network 619 via the antenna 618. Although a single transceiver 611 is shown in FIG. 6 for both voice and data communications, the mobile device 600 may include more than one distinct transceivers, such as a first transceiver for transmitting and receiving voice signals, and a second transceiver for transmitting and receiving data signals.

In addition to processing the communication signals, the DSP 620 also provides for receiver and transmitter control. For example, the gain levels applied to communication signals in the receiver 612 and transmitter 614 may be adaptively controlled through automatic gain control algorithms implemented in the DSP 620. Other transceiver control algorithms could also be implemented in the DSP 620 in order to provide more sophisticated control of the transceiver 611.

The microprocessor 638 preferably manages and controls the overall operation of the mobile device 600. Many types of microprocessors or microcontrollers could be used for this part, or, alternatively, a single DSP 620 could be used to carry out the functions of the microprocessor 638. Low-level communication functions, including at least data and voice communications, are performed through the DSP 620 in the transceiver 611. Other, high-level communication applications, such as a voice communication application 624A, and a data communication application 624B may be stored in the Flash memory 624 for execution by the microprocessor 638. For example, the voice communication module 624A may provide a high-level user interface operable to transmit and receive voice calls between the mobile device 600 and a plurality of other voice devices via the network 619. Similarly, the data communication module 624B may provide a high-level user interface operable for sending and receiving data, such as e-mail messages, files, organizer information, short text messages, etc., between the mobile device 600 and a plurality of other data devices via the network 619. On the mobile device 600, a messaging software application may operate in conjunction with the data communication module 624B in order to implement the techniques described above.

The microprocessor 638 also interacts with other device subsystems, such as the display 622, Flash memory 624, RAM 626, auxiliary input/output (I/O) subsystems 628, serial port 630, keyboard 632, speaker 634, microphone 636, a short-range communications subsystem 640 and any other device subsystems generally designated as 642. The components 628, 632, 634 and 636 are examples of the types of subsystems that could be provided as UIs 62 (FIG. 3). The modules 624A-N are executed by the microprocessor 638 and may provide a high-level interface between a user of the mobile device and the mobile device. This interface typically includes a graphical component provided through the display 622, and an input/output component provided through the auxiliary I/O 628, keyboard 632, speaker 634, or microphone 636.

Some of the subsystems shown in FIG. 6 perform communication-related functions, whereas other subsystems may provide "resident" or on-device functions. Notably, some subsystems, such as keyboard 632 and display 622 may be used for both communication-related functions, such as entering a text message for transmission over a data communication network, and device-resident functions such as a calculator or task list or other PDA type functions.

Operating system software used by the microprocessor 638 is preferably stored in a non-volatile store such as Flash memory 624. As those skilled in the art will appreciate, the Flash memory 624 is one type of non-volatile store, which could instead be implemented as a battery backed-up RAM, for example. In addition to the operating system and communication modules 624A-N, the Flash memory 624 may also include a file system for storing data. A storage area is also preferably provided in the Flash memory 624 to store received and possibly sent messages, as well as public keys, a private key, and other information that may be required for secure messaging. The operating system, specific device applications or modules, or parts thereof, may be temporarily loaded into a volatile store, such as RAM 626 for faster operation. Moreover, received communication signals may also be temporarily stored to RAM 626 before permanently writing them to a file system located in the persistent store 624.

An exemplary application module 624N that may be loaded onto the dual-mode device 100 is a personal information manager (PIM) application providing PDA functionality, such as calendar events, appointments, and task items. This module 624N may also interact with the voice communication module 624A for managing phone calls, voice mails, etc., and may also interact with the data communication module 624B for managing e-mail communications and other data transmissions. Alternatively, all of the functionality of the voice communication module 624A and the data communication module 624B may be integrated into the PIM module.

The Flash memory 624 preferably provides a file system to facilitate storage of PIM data items on the device. The PIM application preferably includes the ability to send and receive data items, either by itself, or in conjunction with the voice and data communication modules 624A, 624B, via the wireless network 619. The PIM data items are preferably seamlessly integrated, synchronized and updated, via the wireless network 619, with a corresponding set of data items stored or associated with a host computer system, thereby creating a mirrored system for data items associated with a particular user.

The mobile device 600 may also be manually synchronized with a host system by placing the mobile device 600 in an interface cradle, which couples the serial port 630 of the mobile device 600 to the serial port of the host system. The serial port 630 may also be used to enable a user to establish messaging settings through an external device or software application, to download other application modules 624N for installation, and to load Certs, keys and other information onto a device. This wired download path may be used to load an encryption key onto the device, which is a more secure method than exchanging encryption information via the wireless network 619. In a similar manner, other types of wired interfaces such as a Universal Serial Bus (USB) port could be implemented in the mobile device 600 in addition to or instead of the serial port 630.

Additional application modules 624N may be loaded onto the mobile device 600 through the network 619, through an auxiliary I/O subsystem 628, through the serial port 630, through the short-range communications subsystem 640, or through any other suitable subsystem 642, and installed by a user in the Flash memory 624 or RAM 626. Such flexibility in application installation increases the functionality of the mobile device 600 and may provide enhanced on-device functions, communication-related functions, or both. For example, secure communication applications may enable electronic commerce functions and other such financial transactions to be performed using the mobile device 600.

When the mobile device 600 is operating in a data communication mode, a received signal, such as a text message or a web page download, will be processed by the transceiver 611 and provided to the microprocessor. 638, which will preferably further process the received signal for output to the display 622, or, alternatively, to an auxiliary I/O device 628. A user of mobile device 600 may also compose data items, such as email messages, using the keyboard 632, which is preferably a complete alphanumeric keyboard laid out in the QWERTY style, although other styles of complete alphanumeric keyboards such as the known DVORAK style may also be used. User input to the mobile device 600 is further enhanced with a plurality of auxiliary I/O devices 628, which may include a thumbwheel input device, a touchpad, a variety of switches, a rocker input switch, etc. The composed data items input by the user may then be prepared as specified in selected messaging settings and transmitted over the communication network 619 via the transceiver 611.

When the mobile device 600 is operating in a voice communication mode, the overall operation of the mobile device 600 is substantially similar to the data mode, except that received signals are preferably output to the speaker 634 and voice signals for transmission are generated by a microphone 636. Alternative voice or audio I/O subsystems, such as a voice message recording subsystem, may also be implemented on the mobile device 600. Although voice or audio signal output is preferably accomplished primarily through the speaker 634, the display 622 may also be used to provide an indication of the identity of a calling party, the duration of a voice call, or other voice call related information. For example, the microprocessor 638, in conjunction with the voice communication module 624A and the operating system software, may detect the caller identification information of an incoming voice call and display it on the display 622.

A short-range communications subsystem 640 may include an infrared device and associated circuits and components, or a short-range RF communication module such as a Bluetooth module or an 802.11 module to provide for communication with similarly-enabled systems and devices.

The above description relates to examples of the present invention. Many variations will be apparent to those knowledgeable in the field, and such variations are within the scope of the invention as described and claimed, whether or not expressly described.

For example, although a wireless mobile communication device is shown in FIGS. 3 and 6 and represents one possible type of device on or in conjunction with which a messaging client may operate, the invention may also be implemented in other systems supporting messaging clients, including desktop and laptop computer systems, networked computer systems and other types of systems.

Furthermore, the systems and methods described herein may be applied to messages which include only a portion of a received message, not only to forward and reply messages, which typically include an entire message. When any content from a message, including any message attachments, is incorporated into an outgoing message by a copy and paste operation, for example, the outgoing message preferably profiles messaging settings associated with message characteristics of the message from which the content was copied. In one possible embodiment, when any content from a message is copied to a clipboard or other temporary store, the messaging settings or characteristics associated with the message or a message identifier used to access the message may also be selected and copied to the clipboard with the copied content, or otherwise linked with the copied content. When the copied content is pasted into an outgoing message, then messaging settings associated with characteristics of the message from which the content was copied are selected for the outgoing message. According to another possible implementation, when any part of a received message is displayed or otherwise accessed in such a way as to permit copying of content from the received message, the messaging settings associated with message characteristics of the received message are selected and used for any outgoing message into which parts of the received message may be copied. Similarly, a messaging client may be configured such that messaging settings related to a received message remain active for any outgoing message until the received message content is no longer available for copying, such as when the received message is closed or a clipboard or other temporary store is cleared, for example.

Messaging settings conflicts that may arise for outgoing messages that are related to more than one previous message may be resolved in a variety of ways. Settings conflicts may occur, for example, when a portion of a first received message with a first group of messaging settings or characteristics is copied into a reply message to a second received message with a second group of messaging settings or characteristics. A simple conflict resolution scheme involves effectively OR-ing the first and second groups of messaging settings or characteristics, substantially as described above for messaging settings over-riding. The resultant group of messaging settings or characteristics thereby includes messaging settings or characteristics corresponding to those in each of the first and second groups. Where control flags are used for one or both of the first and second messages, the first and second groups may be combined and/or changed in accordance with the flags. A messaging client may instead be configured to select a most secure group of messaging settings or characteristics between multiple groups. Other conflict resolution schemes may also be apparent to those skilled in the art and, as such, are considered to be within the scope of the systems and methods described herein.

In addition, control flags or similar control information need not necessarily be stored in a message store with a received message as described above. This type of control information could instead be stored in a different store or memory than a received message. Where the different store or memory is indexed by a message identifier, a messaging client locates corresponding messaging settings in the different store or memory using a message identifier for a received message to which an outgoing message is related.

Messaging settings profiling has been described above primarily in the context of outgoing messages that are related to received messages. However, similar techniques may be applied when an outgoing message is related to other types of messages, such as when a saved or previously sent message is to be re-sent or forwarded.

It is also contemplated that a greater degree of control over outgoing messages related to a received message could be provided to a sender of the received message. Message permissions or restrictions may be established by the message sender to control how a message is handled or processed at a receiving messaging client. Permissions or restrictions may control, for example, whether the message may be forwarded or sent to other recipients, to whom a message may be forwarded, how the message may be forwarded, and the like. In such a system, a recipient messaging client may be configured to contact the sender of a received message where a restricted operation is being attempted on the received message. This functionality supports sender auditing of whether and how often recipients attempt to perform restricted operations on messages it sends, and may also provide a mechanism for a sender to provide permissions to over-ride a message restriction on a per message and as required basis. Restricted operations may then proceed where the sender provides appropriate permission. The sender may thereby maintain ultimate control over any message restriction over-rides.

INDUSTRIAL APPLICABILITY

The invention relates generally to the field of electronic messaging, and in particular to selecting messaging settings to control message characteristics on a messaging client.

The invention claimed is:

1. A processor-implemented method, comprising:
    detecting, with a processor, an outgoing message;
    determining, with the processor, that the outgoing message is related to a previously received message by identifying at least a portion of message content in common or comprising a message thread between the outgoing message and the previously received message;
    determining, with the processor, one or more messaging settings associated with at least one message characteristic of the previously received message; and
    selecting, with the processor, a messaging setting based on the one or more messaging settings associated with the at least one message characteristic of the previously received message to control a message characteristic of the outgoing message, wherein the selecting the messaging setting comprises:
        determining whether the outgoing message is a reply message to the previously received message or a forward message to the previously received message;
        if the outgoing message is the reply message to the previously received message, selecting a first message setting in response to determining that the outgoing message is the reply message to the previously received message; and
        if the outgoing message is the forward message to the previously received message, selecting a second message setting in response to determining that the outgoing message is the forward message to the previously received message, wherein the first message setting and the second message setting are different.

2. The method of claim 1, wherein the at least one message characteristic includes a security message characteristic.

3. The method of claim 2, wherein the security message characteristic comprises at least one of a message signing characteristic or a message encryption characteristic.

4. The method of claim 1, wherein determining that the outgoing message is related to the previously received message comprises determining that the outgoing message includes a portion of the previously received message.

5. The method of claim 4, wherein the outgoing message comprises an attachment that is common to a previously received attachment received with the previously received message, and wherein determining that the outgoing message includes a portion of the previously received message comprises determining that the outgoing message includes the attachment that is common to the previously received attachment.

6. The method of claim 1, wherein the previously received message comprises a messaging settings field specifying the messaging setting used for the previously received message, and wherein the one or more messaging settings associated with the at least one message characteristic of the previously received message are determined by accessing the messaging settings field in the previously received message.

7. A device, comprising:
    a memory; and
    at least one hardware processor communicatively coupled with the memory and configured to:
        detect an outgoing message;
        determine that the outgoing message is related to a previously received message by identifying at least a portion of message content in common or comprising a message thread between the outgoing message and the previously received message;
        determine one or more messaging settings associated with at least one message characteristic of the previously received message; and
        select a messaging setting based on the one or more messaging settings associated with the at least one message characteristic of the previously received message to control a message characteristic of the outgoing message, wherein the at least one hardware processor configured to select the messaging setting comprises the at least one hardware processor configured to:
            determine whether the outgoing message is a reply message to the previously received message or a forward message to the previously received message;
            if the outgoing message is the reply message to the previously received message, select a first message setting in response to determining that the outgoing message is the reply message to the previously received message; and
            if the outgoing message is the forward message to the previously received message, select a second message setting in response to determining that the outgoing message is the forward message to the previously received message, wherein the first message setting and the second message setting are different.

8. The device of claim 7, wherein the at least one message characteristic includes a security message characteristic.

9. The device of claim 8, wherein the security message characteristic comprises at least one of a message signing characteristic or a message encryption characteristic.

10. The device of claim 7, wherein determining that the outgoing message is related to the previously received message comprises determining that the outgoing message includes a portion of the previously received message.

11. The device of claim 10, wherein the outgoing message comprises an attachment that is common to a previously received attachment received with the previously received message, and wherein determining that the outgoing message includes a portion of the previously received message comprises determining that the outgoing message includes the attachment that is common to the previously received attachment.

12. The device of claim 7, wherein the previously received message comprises a messaging settings field specifying the messaging setting used for the previously received message, and wherein the one or more messaging settings associated with the at least one message characteristic of the previously received message are determined by accessing the messaging settings field in the previously received message.

13. A non-transitory computer-readable medium containing instructions which, when executed, cause a computing device to perform operations comprising:
    detecting, with a processor, an outgoing message;

determining, with the processor, that the outgoing message is related to a previously received message by identifying at least a portion of message content in common or comprising a message thread between the outgoing message and the previously received message;

determining, with the processor, one or more messaging settings associated with at least one message characteristic of the previously received message; and selecting, with the processor, a messaging setting based on the one or more messaging settings associated with the at least one message characteristic of the previously received message to control a message characteristic of the outgoing message, wherein the selecting the messaging setting comprises:

determining whether the outgoing message is a reply message to the previously received message or a forward message to the previously received message;

if the outgoing message is the reply message to the previously received message, selecting a first message setting in response to determining that the outgoing message is the reply message to the previously received message; and if the outgoing message is the forward message to the previously received message, selecting a second message setting in response to determining that the outgoing message is the forward message to the previously received message, wherein the first message setting and the second message setting are different.

14. The non-transitory computer-readable medium of claim 13, wherein the at least one message characteristic includes a security message characteristic.

15. The non-transitory computer-readable medium of claim 14, wherein the security message characteristic comprises at least one of a message signing characteristic or a message encryption characteristic.

16. The non-transitory computer-readable medium of claim 13, wherein determining that the outgoing message is related to the previously received message comprises determining that the outgoing message includes a portion of the previously received message.

17. The non-transitory computer-readable medium of claim 16, wherein the outgoing message comprises an attachment that is common to a previously received attachment received with the previously received message, and wherein determining that the outgoing message includes a portion of the previously received message comprises determining that the outgoing message includes the attachment that is common to the previously received attachment.

* * * * *